United States Patent [19]

Oestreich et al.

[11] Patent Number: 4,496,214
[45] Date of Patent: Jan. 29, 1985

[54] OPTICAL CABLE

[75] Inventors: Ulrich Oestreich; Werner Schubert, both of Munich, Fed. Rep. of Germany

[73] Assignee: Siemens Aktiengesellschaft, Berlin & Munich, Fed. Rep. of Germany

[21] Appl. No.: 349,452

[22] Filed: Feb. 17, 1982

[30] Foreign Application Priority Data

Mar. 5, 1981 [DE] Fed. Rep. of Germany ....... 3108381

[51] Int. Cl.³ ............................................. H02B 5/16
[52] U.S. Cl. ................................................ 350/96.23
[58] Field of Search ..................................... 350/96.23

[56] References Cited

U.S. PATENT DOCUMENTS 4,146,302 3/1979 Jachimowicz .................... 350/96.23
4,365,865 12/1982 Stiles ............................... 350/96.23

FOREIGN PATENT DOCUMENTS 2709106 9/1978 Fed. Rep. of Germany .
2723659 11/1978 Fed. Rep. of Germany .

Primary Examiner—William L. Sikes
Assistant Examiner—Robert E. Wise
Attorney, Agent, or Firm—Hill, Van Santen, Steadman & Simpson

[57] ABSTRACT

The optical cable having an outer jacket and a plurality of optical transmission elements and auxiliary elements for receiving tensile loading, each of said optical transmission elements containing one or more fiber optical waveguides characterized by the optical transmission elements and auxiliary elements being stranded together around a central core with an alternating direction of twist, and a thin intermediate layer holding the elements in their place at a point of separation but allowing unstranding of the elements once the auxiliary elements are subjected to a longitudinal pull. Thus, the stranding of both the optical transmission elements as well as the auxiliary elements can be cancelled over a limited length for each element to produce an excess length for each of the elements.

10 Claims, 3 Drawing Figures

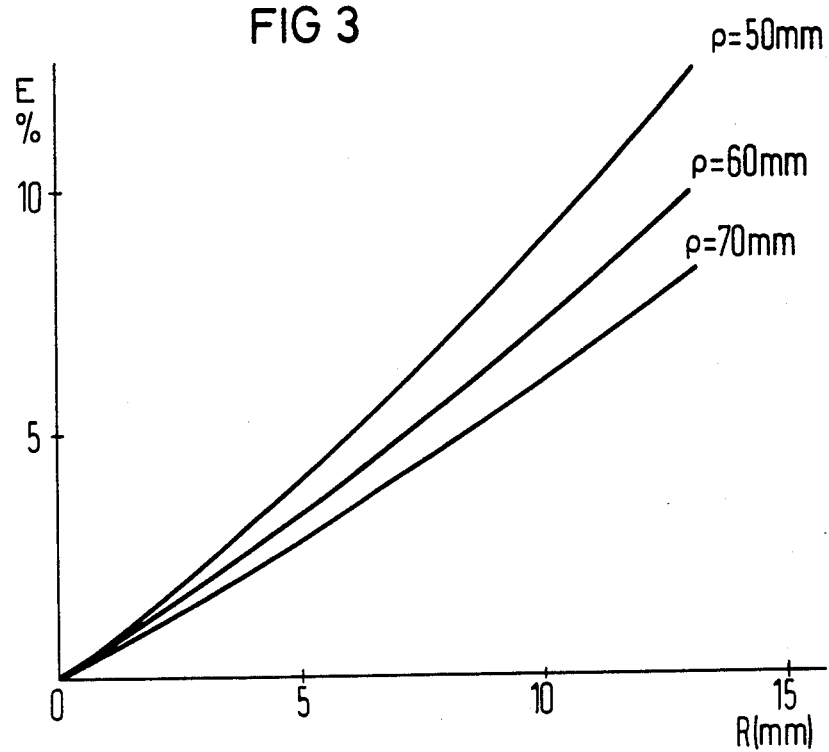

OPTICAL CABLE

BACKGROUND OF THE INVENTION

The present invention is directed to an improvement in an optical cable having a plurality of optical transmission element, each element having at least one optical fiber, and a plurality of auxiliary elements for supporting tension loads, said transmission elements being stranded with the auxiliary elements on a central core with an alternating direction of twist and the stranded elements being covered by a common surrounding jacket.

An optical cable, which includes both optical transmission elements and auxiliary elements that are stranded with an alternating twist on a cable is disclosed in German O.S. No. 27 09 106. In the cable of this patent, the optical transmission elements are stranded onto a central core with an alternating direction of twist so that the direction of twist is retained for a maximum of approximately two lengths of lay. The optical transmission elements themselves are loosely disposed or, respectively, disposed so as to be displaceable in the circumferential direction of the core. This is achieved by utilizing auxiliary elements, which are designed as stiffening elements or skeins and are present for mechanical reasons such as supporting tension loads and are firmly pressed against the core by means of a jacket which are applied on the outside of the cable. These auxilliary events with the core and the jacket form circumferential spaced channels that have an alternating twist and each channel loosely receives a plurality of transmission elements.

It is desirable in some instances to have a large reserve length for the optical transmission element which can be exploited when needed. This can be in the case for instance when the optical cable has already been installed and is damaged at a specific location. Thus, it needs to be repaired by means of utilizing a repair socket. In this case, a sufficient amount of excess length for the optical transmission elements must be available. However, it is not admissable to exert to great a mechanical longitudinal stress on the optical transmission element in order to achieve this excess length.

SUMMARY OF THE INVENTION

The present invention is directed to providing an optical cable of a type which includes both optical transmission elements and auxiliary elements which are stranded with each other on a central core with an alternating direction of twist and which cable includes a common outer jacket covering the entire stranded elements, and which cable enables a sufficiently greater excess length to be created in the optical elements without subjecting the optical elements to undesirable mechanical loads while creating this access length.

This object is achieved by providing means for holding the optical transmission elements and the auxiliary elements inside of the cable jacket so that when applying a longitudinal pull on one of the auxiliary elements at a point of separation of the cable, both the auxiliary elements and the adjacent optical transmission elements will have their stranding cancelled over a limited length to create an excess length for each of these elements.

Since the longitudinal stress at the point of separation of a cable is exerted on the auxiliary elements and not onto the optical transmission elements, the auxiliary element can move together with the optical transmission elements around the core while the stranding is unraveled and inadmissable or undesirable mechanical loads on the optical transmission elements will not occur while obtaining the larger excess links for each of the elements. The unraveling of the stranded elements which have the alternating direction of twist produces a sufficiently large excess length so that the repair of a cable which has already been laid can also be accomplished in a simple manner. On the other hand, the stranding bond within the cable is sufficiently stable that the stranding is retained at a normal point of separation of the cable without an additional longitudinal pull being applied to the auxiliary elements so that the core does not spring out of the inside of the jacket while unraveling the stranded elements. Moreover, the inventive optical cable is also particularly well suited for splicing at normal branching locations because the required excess length can be easily produced by means of opening the SZ stranding structure. The SZ stranding can be employed at elements which are not to be branched off in order to bypass elements which are to be branched off.

It is desirable that the auxiliary elements have a diameter which is at least the same size as the diameter of the optical transmission elements and is preferably a somewhat larger diameter. Thus, it is desirable that the auxiliary elements have a diameter equal to and greater than the diameter of the optical transmission elements. It is also desirable that a ratio of the number of auxiliary elements to the number of optical transmission elements is in a range of from 1:1 to 1:10. Preferably the ratio is 1:2 to 1:4. When stranding the optical transmission elements and the auxiliary elements on the core, they are preferably uniformly distributed over either the circumference of the core or the circumference of each layer or ply. It is also note that each strand is twisted through a plurality of stranding turns in each direction and that the number of turns is selected to be very small and preferably in a range of 1 to 2 turns. It is also desirable that the optical transmission elements as well as the auxiliary elements exhibit only a slight coefficient of friction relative to each other and also relative to the single core.

BRIEF DESCRIPTION OF THE DRAWINGS

FIG. 3 is a diagram illustrating the relationship of the excess length as a function of the stranding radius wherein the radius of curvature of the stranding spiral is selected as a parameter.

DESCRIPTION OF THE PREFERRED EMBODIMENTS

Figure 1:
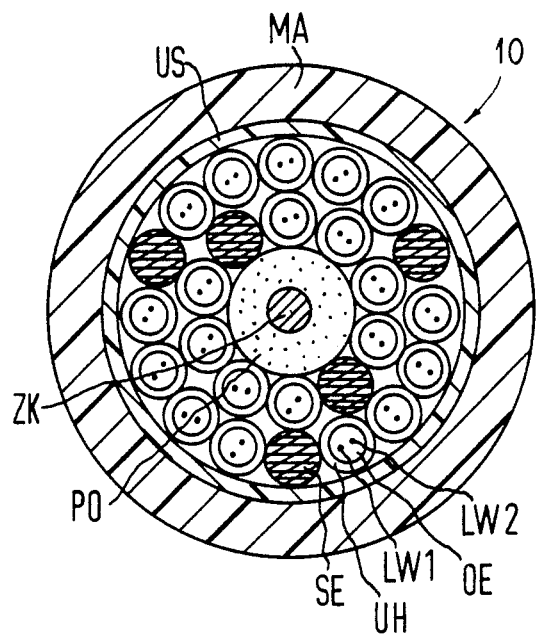
FIG. 1 is a transverse cross-sectional view of a cable in accordance with the present invention.
Figure 2:
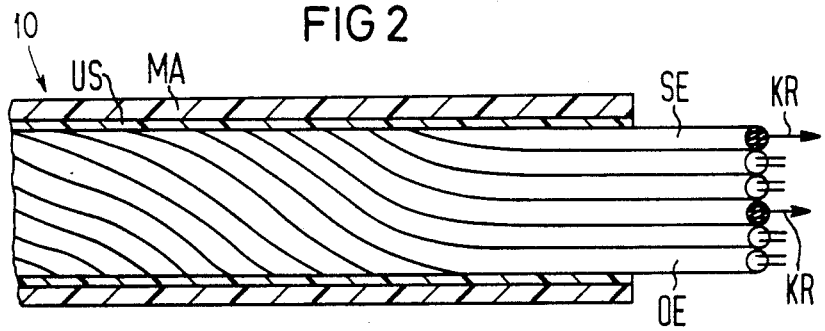
FIG. 2 is a longitudinal cross-sectional view of a cable in accordance with the present invention illustrating the partial cancellation of the stranding to create an excess length in each of the elements.

The principles of the present invention are particularly useful when utilized in an optical cable generally indicated at 10 in FIGS. 1 and 2. The cable 10 has a support element or core ZK which consists for example of a high strength fiber glass, an epoxy resin or a spring steel wire. The core ZK is covered by an intermediate layer PO of smooth rubber or synthetic material.

In the illustrated example of the cable 10, two ply or layers of the stranding elements are stranded onto the layer PO. However, it should be noted that if the number of elements is not high enough, one ply or layer can be used or also more than two plys or layers can be used if necessary.

Each of the plys or layers consists of optical transmission elements OE and auxiliary elements SE. Each of the optical transmission elements OE in the present sample embodiment, consist of a tubular sheath UH which contains two light waveguide fibers LW1 and LW2. Other configurations for an optical transmission element can be utilized. For example a configuration which only has a single fiber light waveguide or one which has more than two fiber waveguides.

Each of the auxiliary elements SE are provided to prevent tension loading of the optical transmission elements OE and for other mechanical reasons. These elements SE preferably consist of tension proof or if need be cross-stiff cables, strings, tubes or the like, and can exhibit more or less pronounced cushioning properties. The allocation of the optical transmission elements OE and of the elements SE should occur in such a manner that as few as possible of the optical transmission elements OE lie directly against one another, and ideally the ratio of the auxiliary elements SE for the optical transmission elements OE is in a range of 1:1 to 1:10 and preferably in a range of 1:2 to 1:4. The optical cable formed in this manner is held together from the outside by a braided cover or intermediate cover US which may either be a braiding, a lap or a thin layer of plastic which is subsequently covered by an outer jacket MA which has been extruded onto the intermediate cover or jacket.

The individual elements SE and OE are stranded in alternating direction of twists, i.e. in a so-called SZ stranding method whereas the thread or the braided cover US is selected in such a manner that the stranding cannot unravel by itself in the longitudinal direction at a point of separation of the cable due to shifting of the stranding elements. Thus, the thread cover or braided cover US presses against the elements OE and SE and provides the cable core with a certain pressure and holds the elements in a fixed position under normal conditions.

When a tension force is exerted on one of the auxiliary elements SE at a point of separation of the cable, the longitudinal movement and at the same time a cross-movement in a circumferential direction of the individual stranded elements can be possible. Thus, the stranding is cancelled over a limited length and a corresponding excess length of both the optical transmission elements OE as well as the auxiliary elements SE is achieved. When the term point of separation is used, this is to include a point at which the cable has been deliberately cut, or a point at which the cable has been broken due to some accidental or unintentional operation.

A simple example of the cable is illustrated in a schematic form in FIG. 2. By means of a longitudinal pull as indicated by the arrows KR, the auxiliary elements SE have their stranding cancelled in such a manner that a normal motion around the core ZK and the core covering PO will occur. In so doing, an excess length of both the optical transmission elements OE as well as the auxiliary SE relative to the length of the core ZK and its covering PO as well as the jacket MA will be achieved.

The amount of excess length obtained from the cancellation of the stranding as a result of a longitudinal pull will increase when a shorter length of the layer is selected. In other words, the alternate twisting in the short length of lay is like providing the fiber in a sinuous path over a portion of the circumference of the core. The unstranding due to pulling or tension loading will cause the sinuous path to be pulled into a straight line path with an excess length being produced.

The inventive cable produces the possiblity of subsequent offering of excess lengths in a simple manner not only in the case for example of repairing cables which have already been laid but also provides a cable structure for example which exhibits little sensitivity during laying. Thus, when a particularly strong tensile stress occurs at a specific location due to the cable structure, the cable can unravel somewhat in the inside due to the orbital motion of the reversing locations. This partial unraveling prevents possible damage to the sensitive light waveguide fibers. Given cables of the plurality of plys, the stranding elements of the inner ply can be spliced out without the outer ply being cut.

For the purpose of explaining the possible excess length, the excess length E (in percent) of the undisturbed spiral over the spiral axis as a function of the stranding radius R (in mm) is illustrated in FIG. 3. The illustrated curve shows the attainable excess length for various radius of curvature of the light waveguide fibers. It is thereby presumed that the entire excess length of the stranding is made useful by means of undoing the SZ structure of the stranding. If one leaves the reduction of the excess length at the reversing locations out of consideration then the maximum available excess length E according to FIG. 3 derives from the individual radius of curvature $\rho$, and thereby follows the definitions and functions which are as follows:

R = stranding radius
S = length of lay
l = unraveled length
$\Delta l$ = additional length
A = amplitude of the sinusoidal up and down motion of the stranding element
D = stranding diameter
P = period length $$\rho = R\left(1 + \frac{S^2}{4\pi^2 R^2}\right) \quad (1)$$

$$\frac{\Delta l}{l} = E = \sqrt{1 + \frac{4\pi^2 R^2}{S^2}} - 1 \quad (2)$$

From the above two equations, one can see that given a somewhat larger stranding radius, an excess length of up to 10% is possible. In order to be able to make this usable, the plurality of turns or layers in each direction may however be only very limited. Preferably there are only one or two lays. If this is not the case, the release of the structure or the shift of the reversing areas of the circumference is no longer possible to sufficient degree without further ado.

This of course forces one to consider the influences of the reversing locations. If one assumes that this is sinusoidal (unwound), then it contains the excess length in a slightly simplified form according to the following equation:

$$\frac{\Delta l}{l} = \frac{\pi^2 \cdot A^2}{P^2} \quad (3)$$

whereas, given the same simplification the following equation $$\frac{\Delta l}{l} = \frac{\pi^2 \cdot D^2}{2 \cdot S^2} \quad (4)$$

is valid for a spiral.

The relationship of equations (3) and (4) is then the relative excess length of the reversing locations $V_\epsilon = \frac{1}{2}$ and the amplitude A of the sign is made equal to stranding radius R when the length of the period length P and the length of the lay S are the same.

This, however, is not always certain. For the purpose of computation of illumination, the spiral slope and the slope of the sine of the "transition" location can first be equated.

The spiral slope from the cable axis is calcuated by the following equation $$\tan\beta_w = \frac{D \cdot \pi}{S} \quad (6)$$

since the slope in the zero point equals $$\tan\beta_s = \frac{A \cdot 2\pi}{P} \quad (7)$$

$$(6) = (7) \text{ and } A = \frac{P \cdot D}{2 \cdot S} \quad (8)$$

If one assumes that the reversing locations can be kept so short that the curvature of the sine is equal in amplitude to the spiral curvature, then, there applies the following equations $$\rho_w = \frac{D^2\pi^2 + S^2}{2D\pi^2} \quad (9)$$

$$\rho_s = \frac{P^2}{4\pi^2 \cdot A} = \frac{1}{2} \cdot \frac{SP}{\pi^2 D} \text{ with (8)} \quad (10)$$

$$(9) = (10) \text{ and } P = \frac{D^2\pi^2 + S^2}{S} \quad (11)$$

$$\text{with (8) } A = \frac{(D^2\pi^2 + S^2) \cdot D}{2S^2} \quad (12)$$

which equations produce a check for equation (3)

$$\frac{\Delta l}{l} = \frac{\pi^2 \cdot D^2}{4 \cdot S^2} \text{ v. (4) and (5)}$$

The relative excess length of n whole turns or lays and the other reversing location is then according to the following equation $$\frac{\Delta l}{l} = \quad (13)$$

$$\left[ n \cdot S \left( \frac{\Delta l}{l} \right)_w + \left( \frac{P}{2} \right)_s \left( \frac{\Delta l}{l} \right)_s \right] \cdot \frac{1}{n \cdot S + \frac{P}{2}}$$

-continued $$= \frac{\pi^2 \cdot D^2}{2 \cdot S^2} \cdot \frac{n \cdot S + \frac{1}{2} \cdot \frac{D^2 \cdot \pi^2 + S^2}{2S}}{n \cdot S + \frac{D^2\pi^2 + S^2}{2S}}.$$

For n = 1 and a stranding diameter D which is not all too great, the exploitable excess length is reduced due to the reversing location to approximately 80% of the spiral excess length, i.e. 4% for example, instead of 5%. Since, however, the approximation of P to S illustrated in equation (11) is not yet technologically attainable, one must presently count on a greater reduction of the effective excess length relative to the cable axis. If, for example, 4% of 5 meters equals 20 cm which are available in the socket, a providing of a reserved fiber length within the socket is superfluous. Such lengths likewise suffice for repairs and for internal branching.

In order to make these lengths useable, specific structural measures have been undertaken since the covering UH of the optical transmission elements OE could otherwise by easily overloaded as a result of the frictional forces between the plys or between the inside ply and the core, or between the outside ply and the jacket during the laying or extraction. Therefore, blind leads referenced as tension elements SE which are highly loadable and have the same and somewhat greater diameter and the same or lower coefficient or friction as the optical transmission elements are provided at specific intervals at the circumference of the stranding elements. These tension elements SE allow for the displacement of the optical elements to occur without causing a deformation of the covering.

Although various minor modifications may be suggested by those versed in the art, it should be understood that we wish to embody within the scope of the patent granted hereon, all such modifications as reasonably and properly come within the scope of our contribution to the art.

We claim:

1. In an optical cable having a plurality of optical transmission elements and a plurality of auxiliary elements for supporting tension loads, said transmission elements each having at least one optical fiber and being stranded with the auxiliary elements on a central core with an alternating direction of twist to form at least one layer of SZ stranded elements, said cable including a common jacket surrounding the SZ stranded elements, the improvement comprising means for holding the SZ stranded optical transmission elements and auxiliary elements inside of the jacket so that a longitudinal pull on at least one auxiliary element at a point of separation of the cable causes the SZ stranding of both the auxiliary element and the adjacent optical transmission elements to be cancelled over a limited length of the elements and provides an excess length for each of the elements.

2. In an optical cable according to claim 1, wherein both the optical transmission elements and the auxiliary elements each exhibit only a slight coefficient of friction relative to one another and relative to the central core.

3. In an optical cable according to claim 1, wherein the plurality of stranding turns in each direction is selected to be very small and preferably in a range of 1 through 2.

4. In an optical cable according to claim 1, wherein the optical transmission elements and the auxiliary elements are uniformly distributed over the circumference of each layer.

5. In an optical cable according to claim 1, wherein the auxiliary elements exhibit a diameter which is equal to and greater than the diameter of the optical transmission elements.

6. In an optical cable according to claim 5, wherein the optical transmission elements and the auxiliary element are uniformly arranged around the circumference of the core.

7. In an optical cable according to claim 1, wherein the ratio of the number of the auxiliary elements relative to the number of optical transmission elements lies in the range of 1:1 to 1:10.

8. In an optical cable according to claim 7, wherein the range of the ratio is 1:2 through 1:4.

9. In an optical cable according to claim 7, wherein the auxiliary elements have a diameter equal to and greater than the diameter of the optical transmission elements.

10. In an optical cable according to claim 7, wherein the optical transmission elements and the auxiliary elements are arranged uniformly in each of the layers around the core.

* * * * *